US008200855B2

(12) United States Patent
Goodart et al.

(10) Patent No.: US 8,200,855 B2

(45) Date of Patent: Jun. 12, 2012

(54) METHOD AND SYSTEM FOR DETECTING DISPLAYPORT SOURCE DEVICE CONNECTIONS TO SINK DEVICE

(75) Inventors: Joe E. Goodart, Austin, TX (US); Seen Yee Cindy Cheong, Singapore (SG); Jae-Ik Lee, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 1087 days.

(21) Appl. No.: 12/148,668

(22) Filed: Apr. 21, 2008

(65) Prior Publication Data

US 2009/0179883 A1 Jul. 16, 2009

Related U.S. Application Data

(60) Provisional application No. 61/011,120, filed on Jan. 15, 2008.

(51) Int. Cl.
*G06F 3/00* (2006.01)
*G06F 3/38* (2006.01)
*G09G 5/00* (2006.01)

(52) U.S. Cl. .......................................... 710/15; 345/211

(58) Field of Classification Search ..................... 710/15
See application file for complete search history.

(56) References Cited

U.S. PATENT DOCUMENTS

| | | | | |
|---|---|---|---|---|
| 5,479,183 | A | 12/1995 | Fujimoto | 345/3 |
| 6,329,983 | B1 | 12/2001 | Wang | 345/211 |
| 7,310,099 | B2 | 12/2007 | Wu et al. | 345/520 |
| 2004/0218627 | A1* | 11/2004 | Kobayashi | 370/465 |
| 2006/0195627 | A1* | 8/2006 | Cole et al. | 710/15 |

OTHER PUBLICATIONS

VESA (Video Electronics Standards Association), VESA DisplayPort Standard, Version 1, Revision 1a, Jan. 11, 2008, 11 pages.*

Proposed DisplayPort™ Standard Errata, "*Proposed Errata Correction and Clarification on DisplayPort Standard Version 1 Revision 1*," VESA DisplayPort Standard Ver. I Errata Correction/Clarification, Oct. 22, 2007.

DisplayPortTM Standard, "*DisplayPort Standard Version 1.1*," VESA DisplayPort Standard, Mar. 19, 2007.

* cited by examiner

*Primary Examiner* — Chun-Kuan Lee
*Assistant Examiner* — Brooke Taylor
(74) *Attorney, Agent, or Firm* — O'Keefe, Egan, Peterman & Enders, LLP

(57) ABSTRACT

Methods and systems are disclosed for detecting DisplayPort (DP) source device connection to sink devices. When the DP link is active, no measurements are made to determine source device connections. When a DP link is not active, a signal line for the auxiliary channel for a DP connection is measured to determine if a source device is connected. More particularly, the auxiliary channel is a differential auxiliary channel, and the positive signal line is measured to make the determination of whether a source device is connected. Still further, an indication is made that a source device is connected if the positive signal line is at a low level, and an indication is made that a source device is not connected if the positive signal line is at a high level.

13 Claims, 3 Drawing Sheets

METHOD AND SYSTEM FOR DETECTING DISPLAYPORT SOURCE DEVICE CONNECTIONS TO SINK DEVICE

RELATED APPLICATIONS

This application claims priority to the following co-pending provisional application: Provisional Application Ser. No. 61/011,120, filed on Jan. 15, 2008, and entitled "METHOD AND SYSTEM FOR DETECTING DISPLAY PORT SOURCE DEVICE CONNECTIONS TO SINK DEVICE," which is hereby incorporated by reference in its entirety.

TECHNICAL FIELD

The disclosed embodiments relate to techniques for detecting cable connections and, more particularly to determining cable connections for DisplayPort enabled systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A number of different connection protocols have been developed and used for connecting devices together, including the connection of displays to information handling systems. One such connection protocol is described in the DisplayPort Standard (Version 1.1) and in the Errata for the DisplayPort Standard (Version 1.1), which are each hereby incorporated by reference in its entirety. As stated therein, the DisplayPort Standard (DP Standard) and DP Standard Errata (Errata) specify an open digital communications interface for use in both internal connections, such as interfaces within a PC or monitor, and external display connections, including interfaces between a PC and monitor or projector, between a PC and TV, or between a device such as a DVD player and TV display. The purpose of this standard is to define a flexible system and apparatus capable of transporting video, audio and other data between a Source Device and a Sink Device over a digital communications interface.

FIG. 2 (Prior Art) and FIG. 3 (Prior Art) provide example block diagrams within the DP Standard to define the interface between a source device and a sink device. These diagrams appear on pages 26 and 141 of the DP Standard (Version 1.1) and are revised on page 48 of the DP Standard Errata.

FIG. 2 (Prior Art) is a block diagram for an embodiment 200 depicting a DP communication link 110 between a source device 102, such as an information handling system, and a sink device 104, such as a display device. As depicted, the source device 102 includes DP transmit (TX) circuitry 106, and the sink device 104 includes DP receive (RX) circuitry 108. The DP link 110 includes a main link 202, auxiliary channel 204 (AUX CH), and a Hot Plug Detect interrupt 206. The main link 202 is used to provide isochronous streams of data from the source device 102 to the sink device 104. The Hot Plug Detect interrupt 206 provides an interrupt signal from the sink device 104 to the source device 102. And the AUX CH 104 is a bi-directional signal line that is used to communicate link and device management information between the source device 102 and the sink device 104.

FIG. 3 (Prior Art) is a circuit diagram 300 for a connection circuit for the AUX CH 204 in FIG. 2 (prior art). As depicted, the AUX CH 204 is a differential connection including a positive signal line (AUX+) and a negative signal line (AUX−). The source device connector is indicated by dotted line 309, and the sink device connector is indicated by dotted line 307. The AUX CH connection is created by the physical connection of the source connector 309 to the sink connector 307.

For the source device, a differential transmit (TX) buffer 302 is coupled to the positive signal line (AUX+), and a differential receive (RX) buffer 304 is coupled to the negative signal line (AUX−). Two 50 ohm resistors are coupled in series between nodes 311 and 313. The common node between these two 50 ohm resistors is connected to a bias voltage (Vbias_TX). In addition, a 100 k ohm resistor is coupled between node 311 and ground. A 100 k ohm resistor is also coupled between node 313 and a positive voltage of about 2.5-3.3 volts. Further, an AC-coupling capacitor (C_AUX) is coupled between nodes 310 and 311, and an AC-coupling capacitor (C_AUX) is coupled between nodes 312 and 313.

For the sink device, a differential receive (RX) buffer 306 is coupled to the positive signal line (AUX+), and a differential transmit (TX) buffer 308 is connected to the negative signal line (AUX−). Two 50 ohm resistors are coupled in series nodes 315 and 317. The common node between these two 50 ohm resistors is connected to a bias voltage (Vbias_RX). In addition, a 1M ohm resistor is coupled between node 315 and a positive voltage of about 2.5-3.3 volts. A 1M ohm resistor is also coupled between node 317 and ground. Further, an AC-coupling capacitor (C_AUX) is coupled between nodes 314 and 315, and an AC-coupling capacitor (C_AUX) is coupled between nodes 316 and 317.

As described in the DP Standard Errata, the DP source device must weakly pull down the positive AUX+ signal line and weakly pull up the negative AUX− signal line with the 100 kΩ resistors between the AC-coupling capacitors (C_AUX) and the source connector 309 to assist detection by the sink device of a DP source device and a powered DP source device. The sink devices must very weakly pull up the positive AUX+ signal line and very weakly pull down the negative AUX− signal line with 1MΩ resistors between the sink connector 307 and the AC-coupling capacitors (C_AUX). As also set forth in the DP Standard Errata, when the DC voltage for the positive AUX+ signal line is at a low (L) level, a DP source device is connected. When the DC voltage for the negative AUX− signal line is at a high (H) level, a powered DP source device is connected. The following table summarizes the operation of the DP source detection as described in the DP Standard Errata.

TABLE 1

| (Prior Art)—Operation of Source Detection as Set Forth in DP Standard andErrata | | |
|---|---|---|
| AUX+ Signal Line Measurement by Sink Device | AUX− Signal Line Measurement by Sink Device | Conclusion |
| HIGH | LOW | Source Device Disconnected |
| LOW | LOW | Source Device Connected but Not Powered |
| LOW | HIGH | Source Device Connected and Powered |

While the DP Standard and the DP Standard Errata describe a general technique for allowing a DP sink device to determine if a DP source device is connected and if this DP source device is powered, a more efficient solution is needed for determining if a DP source device is connected to a DP sink device.

SUMMARY

The techniques described herein provide a method and system for detecting DisplayPort (DP) source device connection to sink devices. When the DP link is active, no measurements are made to determine source device connections. When a DP link is not active, a signal line for the auxiliary channel for a DP connection is measured to determine if a source device is connected. More particularly, the auxiliary channel is a differential auxiliary channel, and the positive signal line is measured to make the determination of whether a source device is connected. Still further, an indication is made that a source device is connected if the positive signal line is at a low level, and an indication is made that a source device is not connected if the positive signal line is at a high level. As described below, other features and variations can be implemented, if desired, and a related method can be utilized, as well.

DESCRIPTION OF THE DRAWINGS

It is noted that the appended drawings illustrate only exemplary embodiments of the techniques described herein and are, therefore, not to be considered limiting of its scope, for the techniques may admit to other equally effective embodiments.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
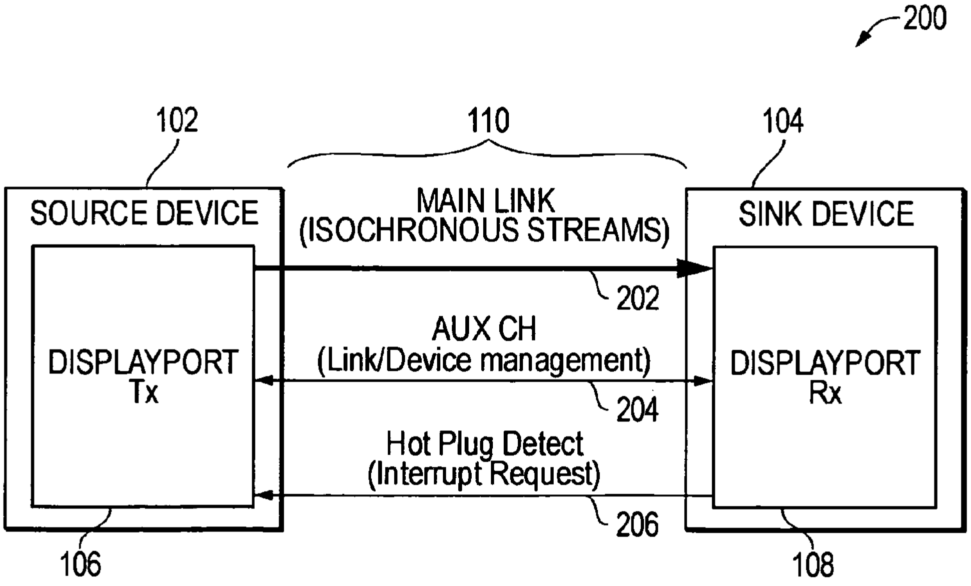
FIG. 2 (Prior Art)
FIG. 2 (prior art) is a block diagram for a standard DP communication link between a DP source device and a DP sink device.
Figure 3:
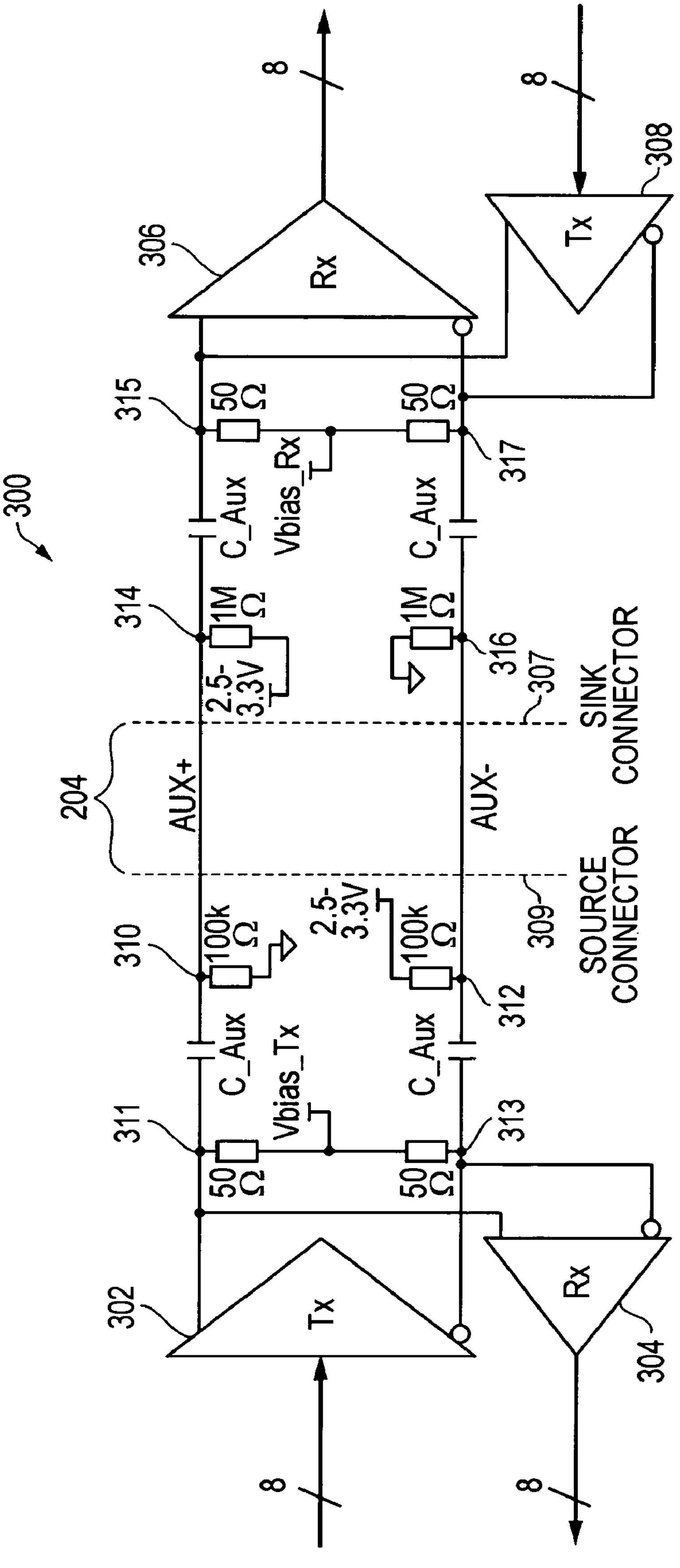
FIG. 3 (Prior Art)
FIG. 3 (prior art) is a circuit diagram for a connection circuit for the auxiliary (AUX CH) channel in FIG. 2 (prior art) for the DP communication link.

Information handling systems have needed connection techniques, and many such connection techniques have been developed and used in the past. One connection protocol is the DisplayPort (DP) Standard. As described above with respect to FIG. 2 (Prior Art) and 3 (Prior Art), the DP Standard defines an interface between a DP source device and a DP sink device, including an auxiliary channel (AUX CH) 204. And the voltage on the differential signal lines for the AUX CH 204 can be used by the sink device to detect the presence of the source device and a powered state for the source device.

With respect to FIGS. 1, 4 and 5 below, a solution is described herein that detects whether a DP source device is connected to a DP sink device only when the DP link is not active. This active link control provides an efficient solution to the detection of a source device connection by a sink device even when the source device is powered down.

Figure 1:
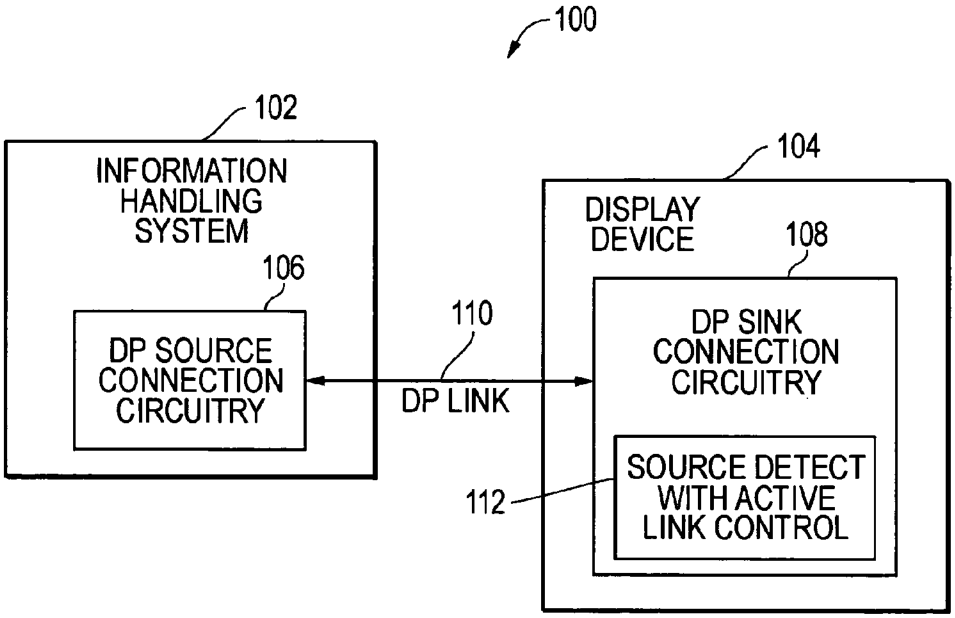
FIG. 1 is a block diagram for an information handling system as a DisplayPort (DP) source device utilizing a DP link to a display device as a DP sink device having source detection with active link control as described herein.

FIG. 1 is a block diagram for an embodiment 100 including an information handling system 102 as a DP source device connected utilizing a DP link 110 to a display device 104 as a DP sink device. The information handling system 102 includes DP source connection circuitry 106 that controls connections to the display device 104 through the DP link 110. The display device 104 includes DP sink connection circuitry 108 that controls connections to the information handling system through the DP link 110. In addition, the DP sink connection circuitry 108 within the display device 104 provides source detection when the DP link is inactive, as described herein, using source detect circuitry 112 with active link control.

Figure 4:
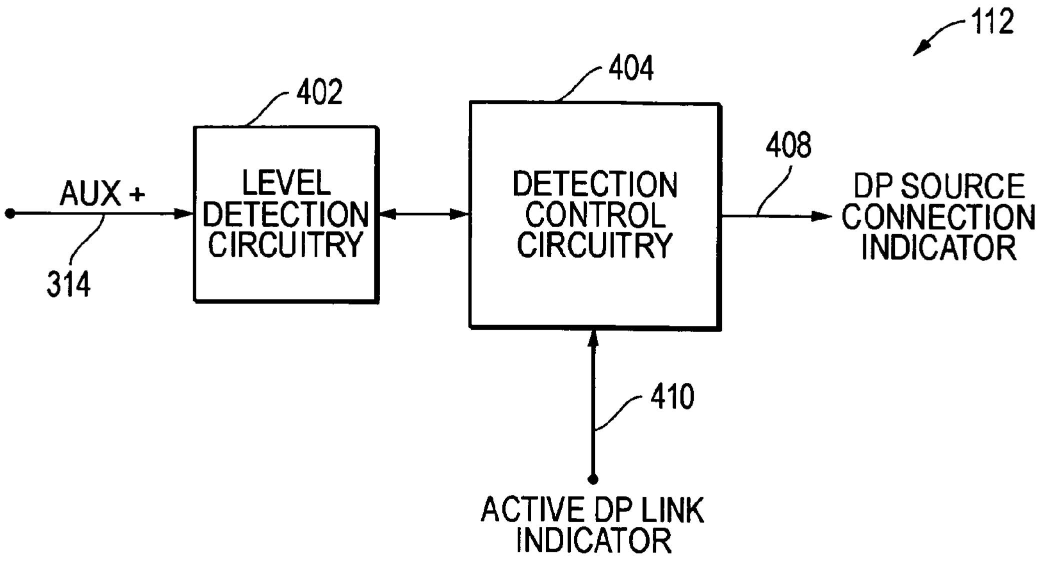
FIG. 4 is a block diagram for source detection circuitry within a DP sink device for determining if a DP source device is connected.

FIG. 4 is a block diagram for source detect circuitry 112 within a DP sink device for determining if a DP source device, such as an information handling system, is connected to a DP sink device, such as a display device. As depicted, the positive signal line (AUX+) at node 314 is connected to level detection circuitry 402. The output of the level detection circuitry 402 is provided to detection control circuitry 404. The DP source connection indicator 408 indicates whether or not a DP source is connected based upon the voltage levels of the AUX+ signal line. In particular, a low level indicates that a source device is connected, and a high level indicates that a source device is not connected. The detection control circuitry 404 also receives an active DP link indicator signal 410. In operation, the active DP link indicator 410 indicates whether or not the DP link 110 is active between the source device 102 and the sink device 104. It is noted that the level detection circuitry 402 could be logic circuits that rely upon the level of the AUX+ signal line to be triggered. The level detection circuitry 402 could also be implemented using other circuitry, as desired.

Significantly, according to the embodiments described herein, the source detect circuitry 112, including the level detection circuitry 402, is active only if the DP link is not active.

Figure 5:
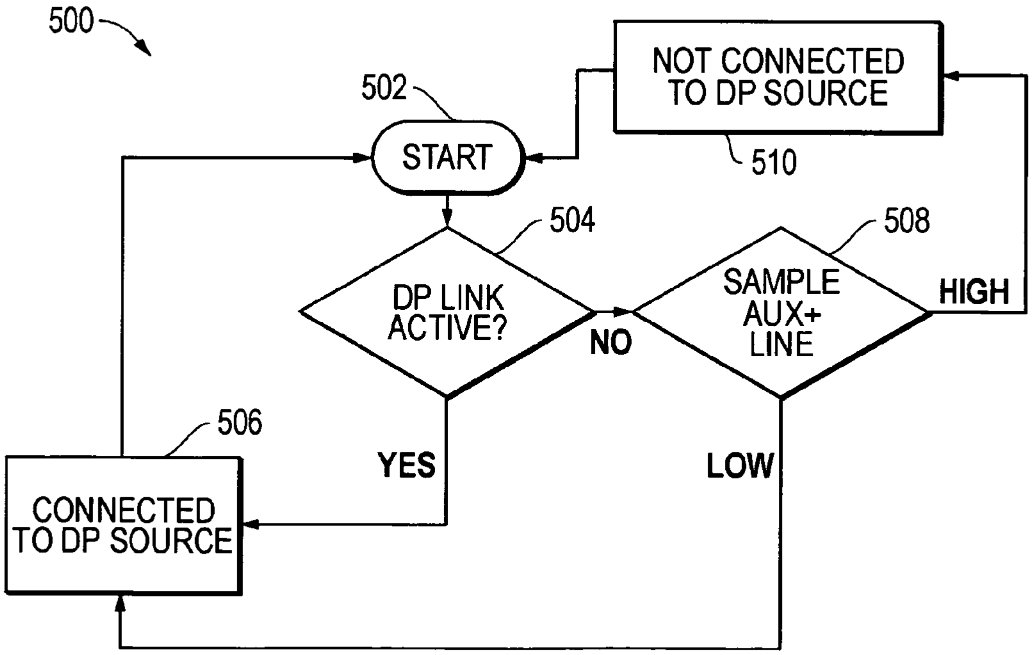
FIG. 5 is a flow diagram for determining if a DP source device is connected to a DP sink device.

FIG. 5 is a flow diagram 500 for determining if a DP source device is connected to a DP sink device. The process starts in block 502. Next, in decision block 504, a determination is made whether the DP link is active. If "YES," the process passes to block 506 where an indication is made that the DP sink device is connected to a DP source device, and then the process passes back to start block 502. If "NO," the process passes to decision block 508 where the voltage level of the AUX+ signal line is sampled. If "LOW," the process passes to block 506 where an indication is made that the DP sink device is connected to a DP source device, and then the process passes back to start block 502. If "HIGH," the process passes to block 510 where an indication is made that the DP sink device is not connected to a DP source device, and then the process passes back to start block 502.

As indicated above, the DP Standard provides that the positive AUX+ signal line be monitored to determine if a DP source is connected and provides that the negative AUX− signal line be monitored to determine if the DP source is powered. In contrast, the source detect circuitry 112 is active only if the DP link is not active. In addition, in the embodiment depicted, the source detect circuitry looks only to the positive AUX+ signal line to determine if a DP source device is connected when the DP link is not active. As such, this active link control is a more efficient solution than is provided by the DP Standard. The following table summarizes the operation of the active link control solution described herein.

TABLE 2

Operation of Source Detection According to the Embodiments Described Herein

| DP Link Activity Determination | AUX+ Signal Line Measurement by Sink Device | Conclusion |
|---|---|---|
| DP Link Is Active | No Measurement | Source Device Connected but Not Powered |
| DP Link Is Not Active | HIGH | Source Device Disconnected |
| DP Link Is Not Active | LOW | Source Device Connected |

Thus, rather than monitor both the AUX+ signal line and the AUX− signal line to determine if the source device is connected and powered, the embodiments described herein conduct monitoring only when the DP link is not active. And the embodiments depicted herein only monitor the positive AUX+ signal line. In this way, no measurement is required while the DP link is active between the devices. As such, this source detection circuitry can be powered down while the DP link is active. Only when the DP link becomes inactive will the level detection circuitry 402 need to be powered up to determine the voltage level on the positive AUX+ signal line. Otherwise, the level detection circuitry 402 can present a high impedance node to the positive AUX+ signal line, such as through the use of a tri-state buffer.

Further modifications and alternative embodiments of the techniques described herein will be apparent to those skilled in the art in view of this description. It will be recognized, therefore, that the techniques described herein are not limited by these example arrangements. Accordingly, this description is to be construed as illustrative only and is for the purpose of teaching those skilled in the art the manner of carrying out the techniques described herein. It is to be understood that the forms of the techniques described herein shown and described are to be taken as the presently preferred embodiments. Various changes may be made in the implementations and architectures. For example, equivalent elements may be substituted for those illustrated and described herein and certain features of the techniques described herein may be utilized independently of the use of other features, all as would be apparent to one skilled in the art after having the benefit of this description of the techniques.

What is claimed is:

1. A method for determining connections to a DisplayPort source device, comprising:

providing a first device configured to be a sink device according to the DisplayPort standard and to have a sink connector including a main link, a hot plug detect signal line, and an auxiliary channel;

determining when a DisplayPort link is active between the first device and a second device, the second device being configured to be a source device according to the DisplayPort standard;

only when the DisplayPort link is not active, measuring a voltage on a signal line for the auxiliary channel to determine if a second device is connected or not, wherein the measuring step comprises utilizing level detection circuitry to generate a source detection signal based upon the voltage on the signal line for the auxiliary channel, powering the level detection circuitry only when the DisplayPort link is not active.

2. The method of claim 1, wherein the measuring step further comprises determining that a second device is not connected to the first device if the voltage is a high level, and determining that a second device is connected to the first device if the voltage is a low level.

3. The method of claim 1, further comprising placing inputs to the level detection circuitry in a high impedance state while the DisplayPort data stream communication link is not active.

4. The method of claim 1, wherein the first device is a display device.

5. The method of claim 4, wherein the second device is an information handling system.

6. A DisplayPort sink device having source detection capabilities, comprising:

receive circuitry configured for the DisplayPort standard;

a sink connector coupled to the receive circuitry and including a main link, a hot plug detect signal line, and an auxiliary channel, the auxiliary channel including a positive auxiliary signal line and a negative auxiliary signal line to form a differential connection;

level detection circuitry within the receive circuitry coupled to the positive auxiliary signal line for the auxiliary channel;

and detection control circuitry within the receive circuitry coupled to receive an output from the level detection circuitry and to receive a signal indicating whether or not a DisplayPort data stream communication link is active for the DisplayPort sink device;

wherein the detection control circuitry is further configured to output a signal indicating whether or not a source device is connected only when the DisplayPort data stream communication link is not active, wherein the level detection circuitry is configured to be powered only when the DisplayPort data stream communication link is not active

7. The DisplayPort sink device of claim 6, wherein the detection control circuitry is further configured to indicate that a source device is not connected if a voltage level for the positive auxiliary signal line for the differential auxiliary channel is a high level and to indicate that a source device is connected if a voltage level for the positive auxiliary signal line for the differential auxiliary channel is a low level.

8. The DisplayPort sink device of claim 6, wherein the sink device is a display device.

9. The DisplayPort sink device of claim 8, wherein the source device is an information handling system.

10. The DisplayPort sink device of claim 6, wherein the inputs to the level detection circuitry are configured to be in a high impedance state while the DisplayPort data stream communication link is not active.

11. Receive circuitry for a DisplayPort sink device, comprising:

level detection circuitry coupled to a positive auxiliary signal line for an auxiliary channel within a DisplayPort connection for a DisplayPort sink device, the auxiliary channel including the positive auxiliary signal line and a negative auxiliary signal line to form a differential connection;

and detection control circuitry within the receive circuitry coupled to receive an output from the level detection circuitry;

wherein the detection control circuitry is further configured to output a signal indicating whether or not a source device is connected only when a DisplayPort data stream communication link is not active between the DisplayPort sink device and a DisplayPort source device, and wherein the level detection circuitry is configured to be powered only when the DisplayPort data stream communication link is not active.

12. The receive circuitry of claim 11, wherein the detection control circuitry is further configured to indicate that a source device is not connected if a voltage level for the positive auxiliary signal line for the differential auxiliary channel is a high level and to indicate that a source device is connected if a voltage level for the positive auxiliary signal line for the differential auxiliary channel is a low level.

13. The receive circuitry of claim 11, wherein the inputs to the level detection circuitry are configured to be in a high impedance state while the DisplayPort data stream communication link is active.

* * * * *